L. B. ABBOTT.
BOLT ANCHOR.
APPLICATION FILED MAY 8, 1911.
1,095,366.  Patented May 5, 1914.
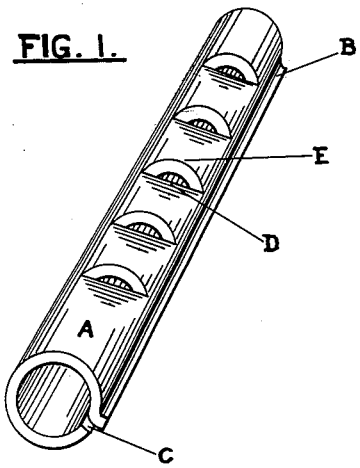
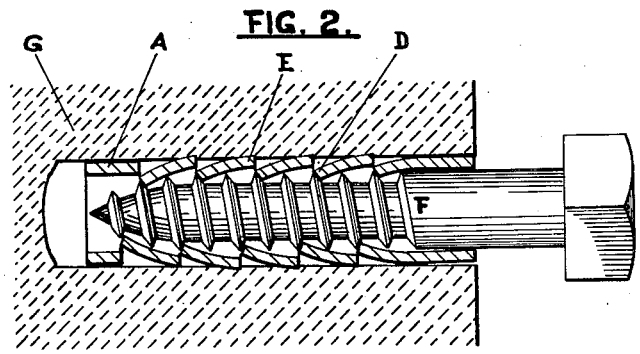
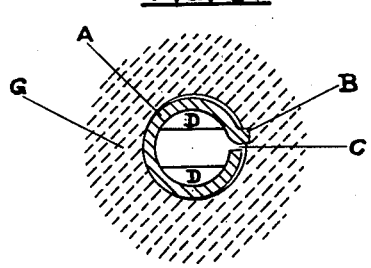
WITNESSES
INVENTOR

UNITED STATES PATENT OFFICE.

LINN B. ABBOTT, OF BRIDGEPORT, CONNECTICUT.

BOLT-ANCHOR.

1,095,366. Specification of Letters Patent. Patented May 5, 1914.

Application filed May 8, 1911. Serial No. 625,705.

*To all whom it may concern:*

Be it known that I, LINN B. ABBOTT, a citizen of the United States, residing at Bridgeport, in the county of Fairfield and State of Connecticut, have invented a new and useful Bolt-Anchor, of which the following is a specification.

This invention relates to an improved metal bushing, for anchoring or fixing a screw or bolt in brickwork, masonry or other like material, in which a thread for the bolt cannot readily be cut.

Referring to the accompanying drawings, Figure 1 is a perspective view of my novel bushing. Fig. 2 is a longitudinal section of the same, showing a lag screw inserted therein. Fig. 3 is a cross section of the same, shown as forced into a stone or brick wall, and before the screw is inserted therein.

A represents the body of the bushing, which is practically cylindrical in form, and slitted lengthwise as at C.

B represents a longitudinal rib, formed from the metal at the edge of the slit. This rib cuts a slot in the side of the hole when the bushing is driven in and prevents the bushing from rotating when the screw is applied. In the drawing I have shown only one longitudinal rib but I do not wish to limit my invention to a single rib, as I have found in practice that the device proves equally good with more than one.

A is also slitted diagonally at proper points to conform to the threads of the screw to be used. One edge of each of these slits is introverted as at D and engages the thread of the screw F as shown in Fig. 2. In the drawing I have shown the introverted edges on one side of the bushing, engaging every other thread of the screw and those on the other side of the bushing engaging the alternate threads. I do not wish to confine my invention to this arrangement however as I have found that other arrangements prove equally good. The metal being introverted as at D, the cut edge of the metal E is presented to the wall of masonry G which surrounds the bushing. When the screw is inserted, the edges of the metal D engage the threads of the screw and the wedging action forces the edges of the metal E into the surrounding masonry and provides an effectual anchor.

Among the objects of my invention are to produce a bolt anchor which is cheap to manufacture, with good holding qualities, and which may be inserted in a relatively small cylindrical hole in the masonry.

Having thus described my invention what I claim as new is:

1. A bolt anchor for securing a bolt, in a hole formed in hard material, comprising a cylindrical sheet metal bushing having a longitudinal slot or opening, transverse slits cut in the cylindrical body, to form the inwardly projecting teeth D, and retaining edges E, the former adapted to forcibly engage the threads of a bolt to expand the bushing and bring the latter in forcible engagement with the walls of the hole.

2. A bolt anchor for securing a bolt in a hole, comprising a cylindrical sheet metal bushing, having a longitudinal opening with one or both of the edges of said opening turned outward to hold the bushing against rotation, said bushing having transverse slits to form the inwardly projecting teeth D, and the retaining edges E, the former adapted to forcibly engage the threads of the bolt to expand the bushing and bring the latter in forcible engagement with the walls of the hole.

In testimony whereof I have hereunto set my hand in the presence of the two subscribing witnesses.

LINN B. ABBOTT.

Witnesses:
J. L. LUCAS,
FRANK B. LUCAS.